(12) United States Patent
Chang et al.

(10) Patent No.: US 11,667,782 B2
(45) Date of Patent: Jun. 6, 2023

(54) POLYVINYLIDENE FLUORIDE FILM COMPOSITION, AND POLYVINYLIDENE FLUORIDE ISOLATION FILM

(71) Applicant: Industrial Technology Research Institute, Hsinchu (TW)

(72) Inventors: Shu-Nung Chang, Taichung (TW); Wen-Bing Chu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 210 days.

(21) Appl. No.: 17/134,149

(22) Filed: Dec. 24, 2020

(65) Prior Publication Data

US 2022/0073720 A1 Mar. 10, 2022

(30) Foreign Application Priority Data

Sep. 9, 2020 (TW) .................. 109130862

(51) Int. Cl.
*C08L 27/16* (2006.01)
*C08L 71/02* (2006.01)
*C08L 79/08* (2006.01)

(52) U.S. Cl.
CPC .............. *C08L 27/16* (2013.01); *C08L 71/02* (2013.01); *C08L 79/08* (2013.01); C08L 2203/16 (2013.01)

(58) Field of Classification Search
CPC .......... C08L 27/16; C08L 71/02; C08L 79/08; C08L 2203/16
See application file for complete search history.

(56) References Cited

U.S. PATENT DOCUMENTS

| 6,313,222 | B1 | 11/2001 | Lin et al. | |
|---|---|---|---|---|
| 8,931,647 | B2 | 1/2015 | Shiki et al. | |
| 2002/0037841 | A1* | 3/2002 | Papadimitriou | A61P 31/18 514/7.7 |

FOREIGN PATENT DOCUMENTS

| CN | 101234301 | | 8/2008 |
|---|---|---|---|
| CN | 101269302 | | 9/2008 |
| CN | 101703897 | | 5/2010 |
| CN | 102512970 | | 6/2012 |
| CN | 104043346 | | 9/2014 |
| CN | 104911814 | | 9/2015 |
| CN | 105032213 | A * | 11/2015 |
| CN | 106457161 | | 2/2017 |
| CN | 108927016 | | 12/2018 |
| CN | 109167013 | | 1/2019 |
| DE | 102011014414 | | 11/2011 |
| KR | 101462939 | | 11/2014 |
| TW | 201601369 | | 1/2016 |
| WO | 2015017588 | | 2/2015 |

OTHER PUBLICATIONS

CN 105032213 A machine translation (Nov. 2015).*
Nita Kusumawati, et al., "The Development of PVDF/PEI Blended Membrane: Effect of Stirring Time on Membrane Characteristics and Performance", Rasayan J. Chem., vol. 12, No. 2, Apr.-Jun. 2019, pp. 975-986.
Xuemei Tan, et al., "A Reviewon Porous Polymeric Membrane Preparation. Part I: Production Techniques with Polysulfone and Poly (Vinylidene Fluoride)" Polymers , Jul. 8, 2019, pp. 1-39.
"Office Action of Taiwan Counterpart Application", dated Mar. 8, 2021, p. 1-p. 5.
Jihye Chae, et al., "Reinforced PEI/PVdF Multicore-Shell Structure Composite Membranes by Phase Prediction on a Ternary Solution", Polymers, Apr. 13, 2018, pp. 1-12.
Xuejuan Zhao, et al., "Hydrophilic modification of poly(vinylidene fluoride)(PVDF) by in situ polymerization of methyl methacrylate (MMA) monomer", Colloid and Polymer Science, Aug. 2010, pp. 1327-1332.
Yunwei Guo, et al., "Effect of PVP Hydrophilic Additive on the Morphology and Properties of PVDF Porous Membranes", Advanced Materials Research, vol. 981, Jul. 2014, pp. 891-894.
A. C. D. Morihama, et al., "Clay nanoparticles effects on performance and morphology of poly(vinylidene fluoride) membranes", Brazilian Journal of Chemical Engineering, Jan.-Mar. 2014, pp. 79-93.
Amir Fadaei, et al., "Structural elucidation of morphology and performance of the PVDF/PEG membrane", Journal of Polymer Research, vol. 21, Aug. 12, 2014, pp. 1-8.
Sevgi Güneş-Durak, et al., "Effect of PVP content and polymer concentration on polyetherimide (PEI) and polyacrylonitrile (PAN) based ultrafiltration membrane fabrication and characterization", Water Sci Technol, May 2018, pp. 329-339.
Enrica Fontananova, et al., "Effect of additives in the casting solution on the formation of PVDF membranes", Desalination, May 10, 2006, pp. 190-197.
N. Pezeshk, et al., "Novel modified PVDF ultrafiltration flat-sheet membranes", Journal of Membrane Science, Nov. 3, 2011, pp. 280-286.

* cited by examiner

*Primary Examiner* — Ana L. Woodward
(74) *Attorney, Agent, or Firm* — JCIPRNET (57) ABSTRACT

A polyvinylidene fluoride film composition and a polyvinylidene fluoride isolation film are provided. The polyvinylidene fluoride film composition includes a polyvinylidene fluoride, a polyetherimide, and a polyether-type nonionic surfactant. The weight ratio of the polyvinylidene fluoride to the polyetherimide is 1:1 to 19:1, and the content of the polyether-type nonionic surfactant is 0.1% to 10% by weight based on a total of 100% by weight of the polyvinylidene fluoride film composition.

11 Claims, 5 Drawing Sheets

# POLYVINYLIDENE FLUORIDE FILM COMPOSITION, AND POLYVINYLIDENE FLUORIDE ISOLATION FILM

CROSS-REFERENCE TO RELATED APPLICATION

This application claims the priority benefit of Taiwan application serial no. 109130862, filed on Sep. 9, 2020. The entirety of the above-mentioned patent application is hereby incorporated by reference herein and made a part of this specification.

TECHNICAL FIELD

The disclosure relates to a polyvinylidene fluoride film composition and a polyvinylidene fluoride isolation film.

BACKGROUND

Because polyvinylidene fluoride has good heat resistance, acid resistance, and chemical resistance, the porous film material thereof is developed for water treatment and isolation films. However, the nature of polyvinylidene fluoride is hydrophobic, and the contact angle of water droplets is about 90 to 100 degrees. Therefore, the wetting effect of the film is poor and pure water flux during filtration is low.

In addition, in the process of manufacturing a polyvinylidene fluoride isolation film, the nature of the material easily causes the film to be shrunk, and the product is warped. Therefore, polyvinylidene fluoride-related products need to be further developed.

SUMMARY

The disclosure provides a polyvinylidene fluoride film composition including a polyvinylidene fluoride, a polyetherimide, and a polyether-type nonionic surfactant. The weight ratio of the polyvinylidene fluoride to the polyetherimide is 1:1 to 19:1, and the content of the polyether-type nonionic surfactant is 0.10% to 10% by weight relative to a total weight of 100% by weight of the polyvinylidene fluoride film composition.

The disclosure also provides a polyvinylidene fluoride isolation film including a polyvinylidene fluoride film and a plurality of micro-holes dispersed in the polyvinylidene fluoride film, and openings are formed at a surface of the polyvinylidene fluoride film. Polyetherimide particles are distributed at a surface of the micro-holes. The polyvinylidene fluoride film includes the aforementioned polyvinylidene fluoride film composition.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Hereinafter, examples of the disclosure are described in detail. The details provided in the examples are exemplary, and are not intended to limit the scope of the disclosure. Those having ordinary skill in the art may modify or change the details according to the requirements of actual implementation. "One" in the disclosure represents "at least one".

According to a plurality of examples of the disclosure, a polyvinylidene fluoride film composition of the disclosure includes a polyvinylidene fluoride, a polyetherimide, and a polyether-type nonionic surfactant.

According to a plurality of examples of the disclosure, the weight ratio of the polyvinylidene fluoride to the polyetherimide of the composition may be 1:1 to 19:1, for example, 1:1, 2:1, 3:1, 3.5:1, 5:1, 10:1, 15:1, 17:1, 19:1, etc. The addition of hydrophilic polyetherimide may alleviate the hydrophobicity issue of the polyvinylidene fluoride film, improve the wettability, and increase the pure water flux of the polyvinylidene fluoride film. Moreover, soft polyetherimide may be entangled with a polyvinylidene fluoride polymer chain. Therefore, polyetherimide particles may be adhered to the polyvinylidene fluoride film, the appearance of the resulting film is not readily warped, and the flatness and uniformity of the film surface thereof may also be improved.

According to a plurality of examples of the disclosure, the weight percentage of the polyether-type nonionic surfactant of the composition may be 0.1% to 10%, and relative to a total of 100% by weight of the polyvinylidene fluoride film composition, may be, for example, 0.1%, 0.5%, 1%, 2%, 5%, 10%. The polyether-type nonionic surfactant helps to adjust the particle size of the polyetherimide. If the content of the polyether-type nonionic surfactant is too low, the particle size of the polyetherimide may not be readily increased. Even if the temperature of the water bath of the polyvinylidene fluoride isolation film process is increased, the effect is still not significant.

According to a plurality of examples of the disclosure, the polyetherimide of the composition may be in the form of particles, and the particles may have the average particle size of 100 nm to 20 μm, for example, 100 nm, 200 nm, 300 nm, 400 nm, 500 nm, 600 nm, 700 nm, 800 nm, 900 nm, 1 μm, 3 μm, 5 μm, 10 μm, 20 μm, etc.

According to a plurality of examples of the disclosure, the polyvinylidene fluoride of the composition may have a weight-average molecular weight of 200,000 to 1,000,000, for example, 200,000 to 800,000, 200,000 to 600,000, 400,000 to 800,000, 400,000 to 600,000, etc.

According to a plurality of examples of the disclosure, the polyetherimide of the composition may have a weight-average molecular weight of 20,000 to 100,000, for example, 20,000 to 80,000, 20,000 to 60,000, 40,000 to 80,000, 40,000 to 60,000, etc.

According to a plurality of examples of the disclosure, the polyether-type nonionic surfactant of the composition may be a polyoxyethylene-polyoxypropylene multi-element copolymer.

According to a plurality of examples of the disclosure, the polyoxyethylene-polyoxypropylene multi-element copolymer may have a weight-average molecular weight of 1,000 to 10,000, such as 1,000, 2,000, 4,000, 6,000, 8,000, 10,000, etc.

According to a plurality of examples of the disclosure, the polyoxyethylene-polyoxypropylene multi-element copolymer may have at least one of the structures shown in formula (C-1) to formula (C-4) below:

plurality of types may be used at the same time, such as using a branched structure alone or a mixture of linear and branched structures.

According to a plurality of examples of the disclosure, the disclosure also provides a polyvinylidene fluoride isolation film including a polyvinylidene fluoride film and a plurality of micro-holes dispersed in the polyvinylidene fluoride film, and openings are formed at a surface of the polyvinylidene fluoride film. Polyetherimide particles are distributed at a surface of the micro-holes. The polyvinylidene fluoride film includes the aforementioned polyvinylidene fluoride film composition.

According to a plurality of examples of the disclosure, the micro-holes in the polyvinylidene fluoride isolation film may be finger-shaped grooves. According to a plurality of examples of the disclosure, the openings of the polyvinylidene fluoride isolation film may have a diameter in a range from 50 nm to 400 nm, for example, 50 nm, 60 nm, 80 nm, 100 nm, 150 nm, 200 nm, 250 nm, 300 nm, 350 nm, 400 nm, etc.

According to a plurality of examples of the disclosure, the average particle size of the polyetherimide particles in the polyvinylidene fluoride isolation film may be 100 nm to 20 μm, for example, 100 nm, 200 nm, 300 nm, 400 nm, 500 nm, 600 nm, 700 nm, 800 nm, 900 nm, 1 μm, 3 μm, 5 μm, 10 μm, 20 μm, etc.

formula (C-1)

formula (C-2)

formula (C-3)

formula (C-4)

in formula (C-1) to formula (C-4), a1 to a9 independently represent an average repeating number of an oxypropylene group, which may be an integer of 1 to 100, and b1 to b10 independently represent an average repeating number of an oxyethylene group, which may be an integer of 1 to 100.

According to a plurality of examples of the disclosure, the polyoxyethylene-polyoxypropylene multi-element copolymer may have a "linear structure", such as the structure shown in formula (C-1) and formula (C-2); or may have a "branched structure", such as the structure shown in formula (C-3) and formula (C-4).

According to a plurality of examples of the disclosure, the polyether-type nonionic surfactant may be used alone, or a <Manufacturing Method of Polyvinylidene Fluoride Isolation Film>

In order to improve the wetting effect of the film and the pure water flux during filtration, a polyvinylidene fluoride isolation film of the disclosure is made by a phase inversion method. The phase inversion method includes a casting solution preparation step and a phase inversion step. The details of each step are described in detail below.

Casting Solution Preparation Step

In the preparation step of the casting solution, polyvinylidene fluoride and polyetherimide powder are dissolved at high temperature using a polar organic solvent. Then, a polyether-type non-ionic surfactant is added, mechanical stirring is performed evenly, and the mixture is left to stand at room temperature for a period of time and air bubbles are eliminated, and lastly a polyvinylidene fluoride/polyetherimide casting solution is obtained.

In the preparation step of the casting solution, the polar organic solvent may be an aprotic solvent such as N-methylpyrrolidone, dimethyl sulfide, N,N-dimethylacetamide, etc. that may dissolve polyvinylidene fluoride and polyetherimide.

In the preparation step of the casting solution, the casting solution needs to be mechanically stirred in a water bath at 50° C. to 90° C., the stirring speed is 200 rpm to 1000 rpm, and the stirring time is 4 hours. The standing time is 8 hours.

Phase Inversion Step

In the phase inversion step, the casting solution is coated on a support material, and then immersed in a coagulation fluid of different temperatures for 30 minutes, then the film is removed and dried to obtain a polyvinylidene fluoride isolation film.

In the phase inversion step, the coating method of the casting solution is not particularly limited. For example, a roll coater, a slit coater, a die coater, a curtain coater, a spray coater, a blade coater, a bar coater, or an air knife coater and the like may be used, wherein a blade coater or a slit coater is preferred.

In the phase inversion step, the material of the support material is not particularly limited, and the support material is mainly used to facilitate the implementation of the coating process and the subsequent application of the polyvinylidene fluoride isolation film of the disclosure. The support material may or may not be removed after the end of the manufacturing process, that is, the polyvinylidene fluoride isolation film product of the disclosure does not need to have a support material. The material of the support material is, for example, porous non-woven fabric, smooth glass plate, metal plate, or the like.

In the phase inversion step, the coagulation fluid is a solvent that is not compatible with polymers, and examples include water and alcohol. The soaking temperature of the coagulation fluid is 20° C. to 80° C., the soaking temperature needs to be higher than the temperature of the casting solution, and the soaking time is 1 minute to 60 minutes.

In the phase inversion step, the drying temperature of the film is room temperature to 100° C.

A polyvinylidene fluoride isolation film of the disclosure may be applied to water treatment or fluid filtration, and may also be applied to isolation films of batteries.

EXAMPLES

Hereinafter, the disclosure is described in more detail through examples, but the disclosure is not limited by these examples. The "%" and "parts" in the examples are mass % and parts by mass unless otherwise stated.

Product property measuring instruments and methods mentioned in the following examples of the disclosure:

Determination of Particle Size of Polyetherimide

Figure 1:
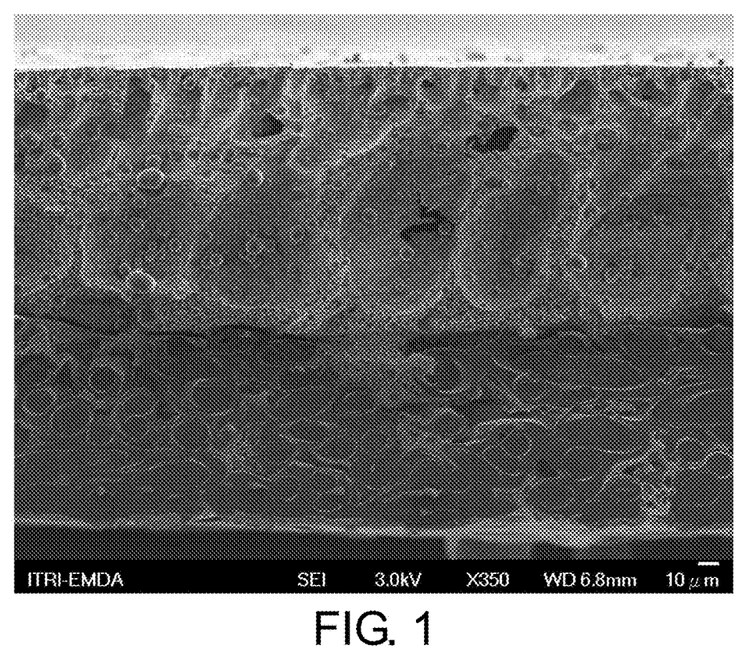
FIG. 1 is an SEM photograph of the cross-section of a polyvinylidene fluoride isolation film prepared in Example 2 of the disclosure.
Figure 3:
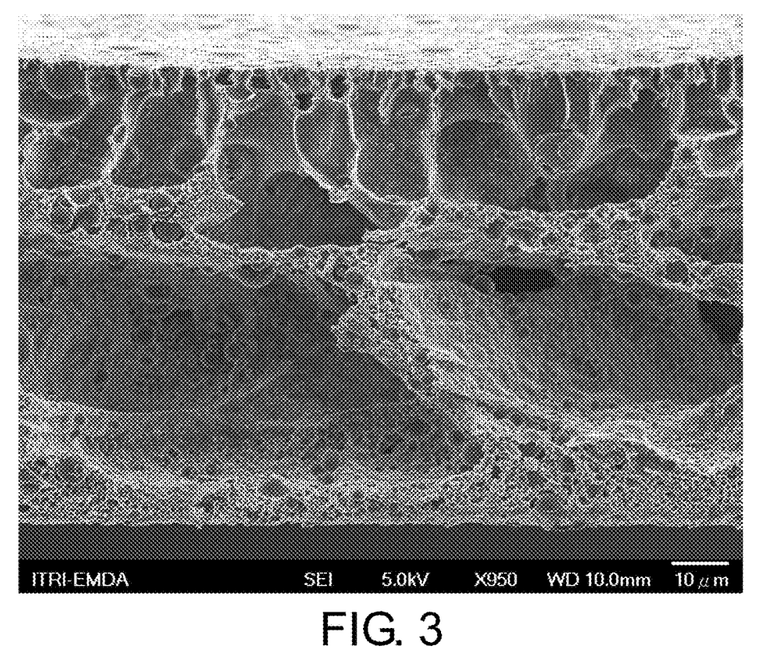
FIG. 3 is an SEM photograph of the cross-section of a polyvinylidene fluoride isolation film prepared in Example 5G of the disclosure.
Figure 5:
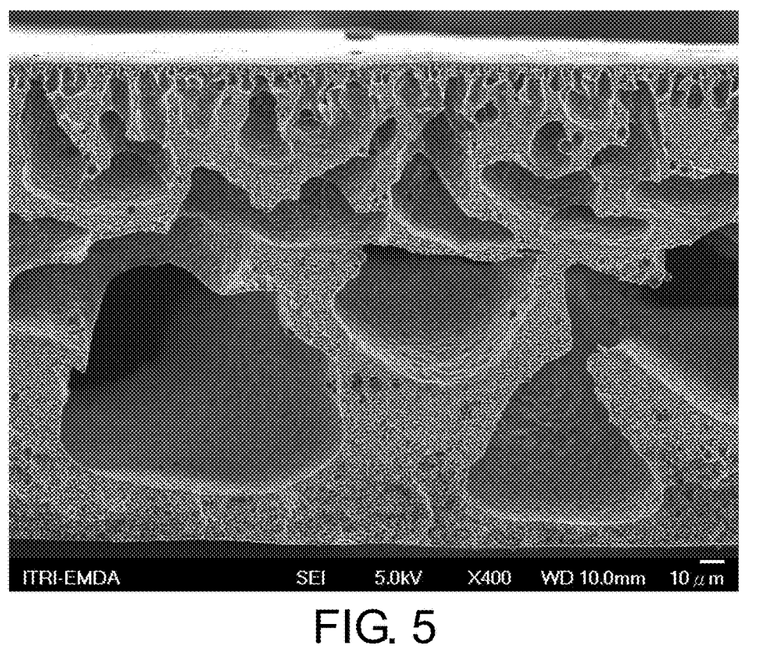
FIG. 5 is an SEM photograph of the cross-section of a polyvinylidene fluoride isolation film prepared in Example 6G of the disclosure.

The cross-sections of the polyvinylidene fluoride isolation films prepared in the examples and comparative examples were scanned and photographed with a scanning electron microscope (SEM), and the particle size of the polyetherimide particles in the micro-holes of the photos was analyzed using Image-Pro Plus software to obtain the maximum particle size and minimum particle size as the distribution range thereof. FIG. 1, FIG. 3, and FIG. 5 are SEM photographs of the cross-section of the polyvinylidene fluoride isolation films of Example 2, Example 5G, and Example 6G, respectively and show that the prepared polyvinylidene fluoride isolation films had micro-holes and there were particles at the surface of the micro-holes.

Determination of Particle Composition of Polyvinylidene Fluoride Isolation Film

Attenuated total reflectance Fourier transform infrared (ATR-FTIR) was used to determine the particle composition of the polyvinylidene fluoride isolation films. Since ATR-FTIR may achieve the object of measuring a spectrum without sample preparation or dilution, ATR-FTIR was suitable for analyzing the original composition of the films.

Figure 7:
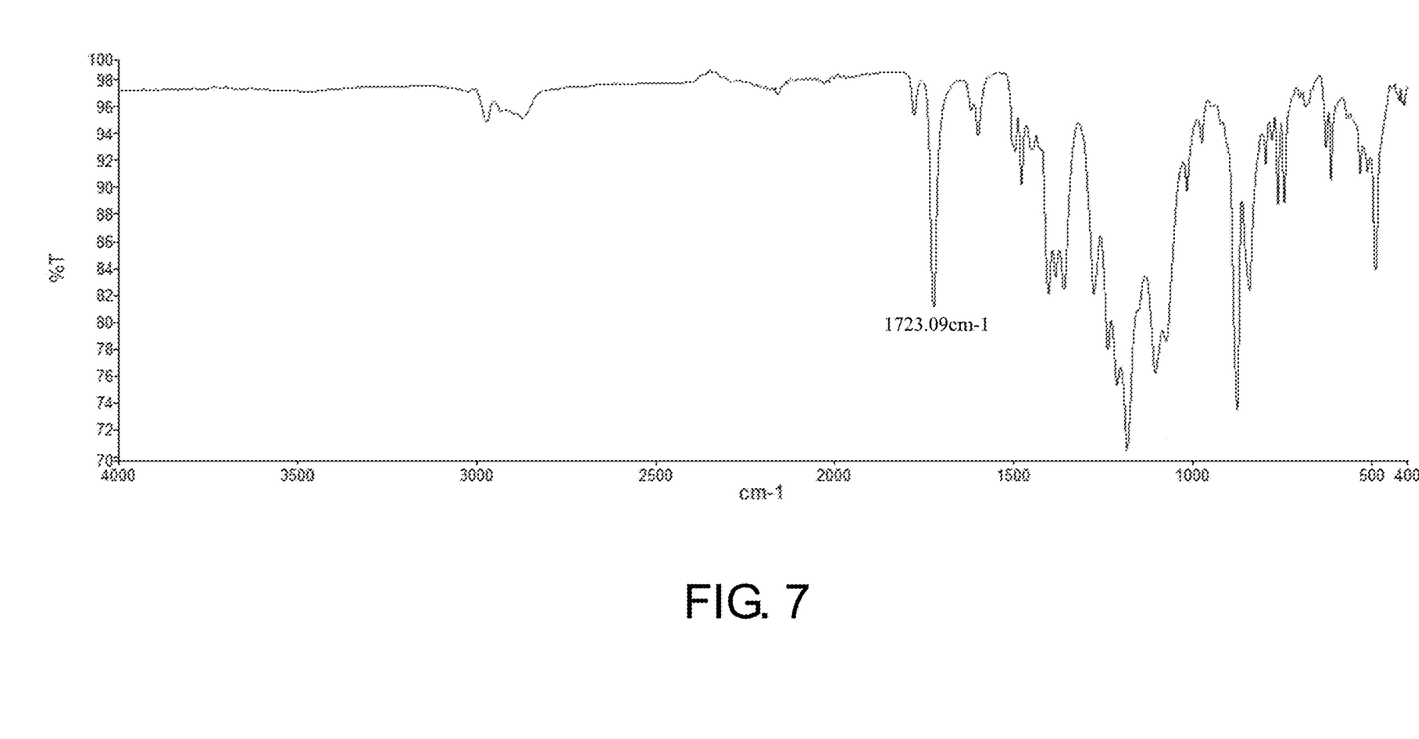
FIG. 7 is the measurement result of Fourier transform infrared spectroscopy (FTIR) of a polyvinylidene fluoride isolation film of Example 2.
Figure 8:
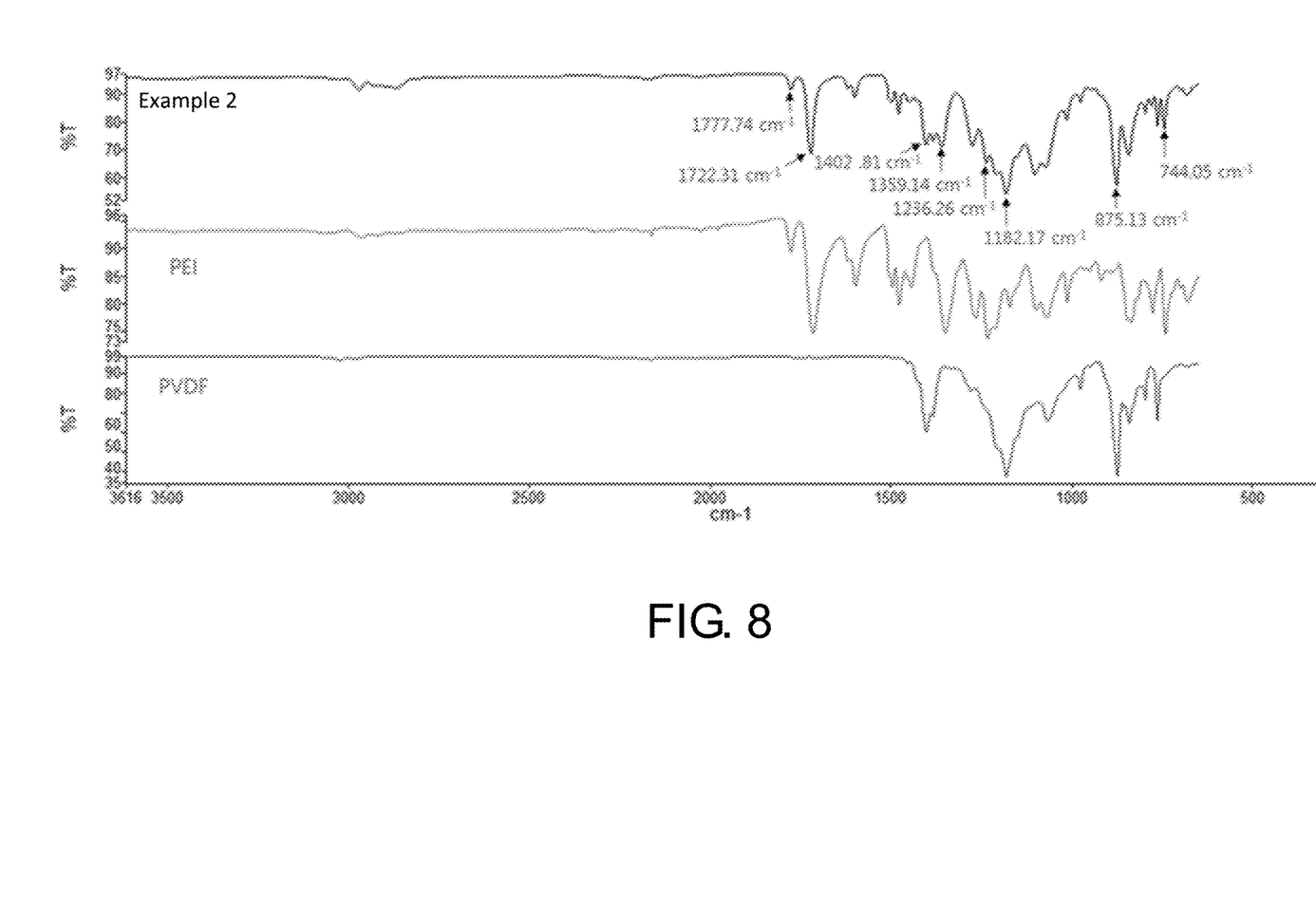
FIG. 8 is a comparison diagram of the FTIR measurement result of a polyvinylidene fluoride isolation film of Example 2 and polyvinylidene fluoride powder and polyetherimide powder.

FIG. 7 is the ATR-FTIR spectrum of the polyvinylidene fluoride isolation film of Example 2, and FIG. 8 is a comparison diagram of the ATR-FTIR spectra of the polyvinylidene fluoride isolation film of Example 2 and polyvinylidene fluoride powder and polyetherimide powder. There were absorption peak signals at 1777.74 $cm^{-1}$ and 1722.31 $cm^{-1}$, which were asymmetric and symmetric stretching of a typical imide carbonyl C=O bond. The absorption peak signals of 1359.14 $cm^{-1}$ and 744.05 $cm^{-1}$ were the stretching and bending of a CN bond, and the absorption peak signal of 1236.26 $cm^{-1}$ was the signal of aromatic ether C—O—C. The combination of the above may confirm the presence of polyetherimide. The vibration signal of $CH_2$ was 1402.81 $cm^{-1}$, and the tensile signals of $CF_2$ and C—C were 1182.17 $cm^{-1}$ and 875.13 $cm^{-1}$, respectively. The combination of the above may confirm the presence of polyvinylidene fluoride. Therefore, it may be concluded from the comparison of the ATR-FTIR spectra of FIG. 7 and FIG. 8 that the polyvinylidene fluoride isolation film of Example 2 should contain polyvinylidene fluoride and polyetherimide.

In addition, element identification of the film cross section structure of the polyvinylidene fluoride isolation film of Example 2 was performed by energy-dispersive X-ray spectroscopy (EDS) with SEM, and particles and non-particles were respectively sampled to perform elemental analysis. The results showed that, in the sample of particles, relative to a peak intensity total of 100% of carbon, oxygen, and fluorine atoms, the peak intensity of carbon atoms accounted for 82.45%, the peak intensity of oxygen atoms accounted for 15.60%, and the peak intensity of fluorine atoms accounted for 1.94%. In contrast, in the sample of non-particles, relative to a peak intensity total of 100% of carbon, oxygen, and fluorine atoms, the peak intensity of carbon atoms accounted for 62.12%, the peak intensity of oxygen atoms accounted for 2.44%, and the peak intensity of fluorine atoms accounted for 35.45%. From the above results, it is believed that in the sample of particles, the content of fluorine atoms was relatively lower, so it may be determined that the main component of the particles should be polyetherimide; in the sample of non-particles, since the content of oxygen atoms is relatively lower, it may be determined that the main component of the non-particles should be polyvinylidene fluoride.

Determination of Opening Diameter of Polyvinylidene Fluoride Isolation Film

Figure 2:
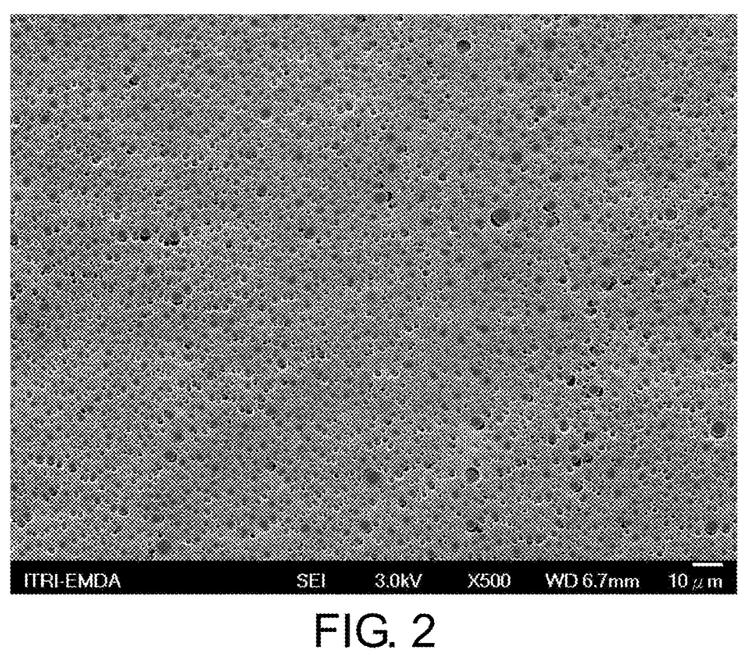
FIG. 2 is an SEM photograph of the surface of a polyvinylidene fluoride isolation film prepared in Example 2 of the disclosure.
Figure 4:
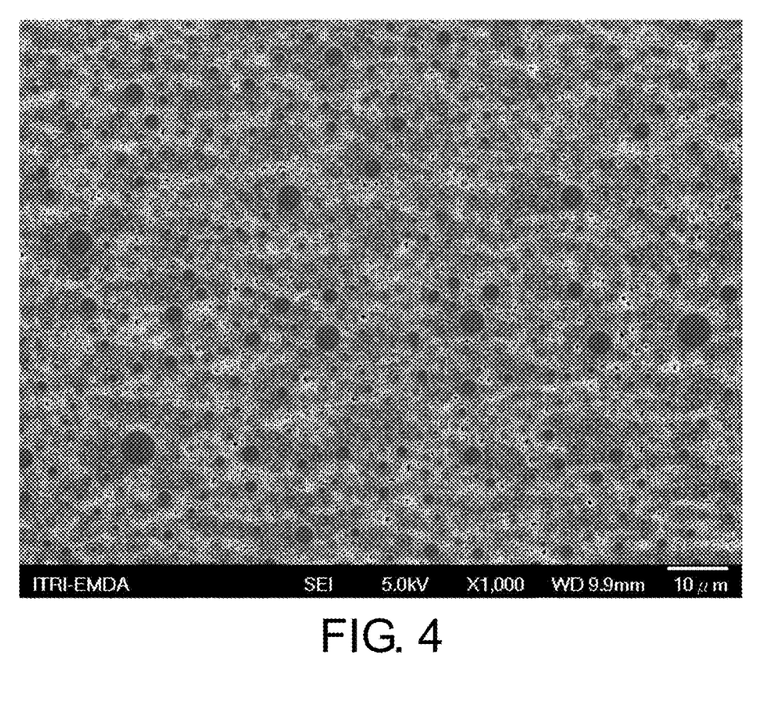
FIG. 4 is an SEM photograph of the surface of a polyvinylidene fluoride isolation film prepared in Example 5G of the disclosure.
Figure 6:
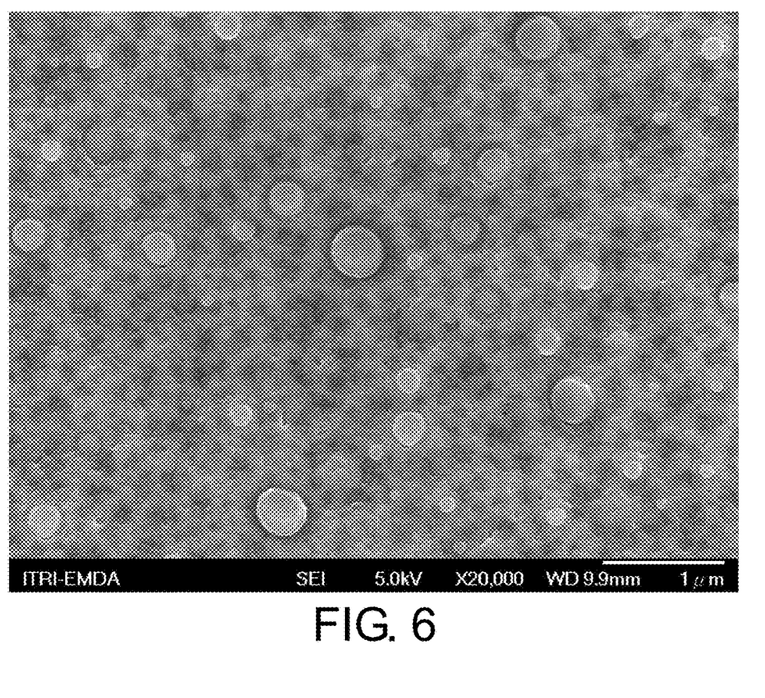
FIG. 6 is an SEM photograph of the surface of a polyvinylidene fluoride isolation film prepared in Example 6G of the disclosure.

The surface of the polyvinylidene fluoride isolation films prepared in the examples and comparative examples was scanned and photographed with a scanning electron microscope, and the opening diameter of the surface of the photographs was analyzed by Image-Pro Plus software to obtain the maximum diameter and the minimum diameter as the distribution range thereof. FIG. 2, FIG. 4 and FIG. 6 are SEM photographs of the surface of the polyvinylidene fluoride isolation films of Example 2, Example 5G, and Example 6G, respectively.

Measurement of Film Surface Contact Angle and Disappearance Time of Droplets

A drop of pure water with a volume of 1 μL was added dropwise to the polyvinylidene fluoride isolation films obtained in the examples and comparative examples, and the initial contact angle between the droplet and the polyvinylidene fluoride isolation films and the time from when the droplet was added dropwise onto the surface of the polyvinylidene fluoride isolation films to completely disappearing on the surface of the polyvinylidene fluoride isolation films (referred to as droplet disappearance time) were recorded.

Determination of Pure Water Flux

The polyvinylidene fluoride isolation films obtained in the examples and comparative examples were respectively made into test pieces of 7 cm×7 cm, and sweep flow filtration was performed at a pressure of 1 bar. The volume of pure water that may pass through a test piece per unit area per minute was taken as the pure water flux thereof.

Determination of Shrinkage Rate

The length and width of the polyvinylidene fluoride isolation films obtained in the examples and comparative examples were measured, and the shrinkage rates in the MD direction and the TD direction were calculated using the following formulas. When the shrinkage rate value was positive, there was expansion in that direction, and when the shrinkage rate value was negative, there was shrinkage in that direction.

Shrinkage rate (%)=(($L1-L0$)/$L0$)×100%

L0: coating length of casting solution in MD/TD direction
L1: length of polyvinylidene fluoride isolation film in MD/TD direction The details of the chemicals used in the following examples and comparative examples of the disclosure are first described as follows:

PVDF: polyvinylidene fluoride, purchased from Arkema, model Kynar® 761, number-average molecular weight about 145,000, weight-average molecular weight about 441,000.

PEI: polyetherimide, purchased from SABIC, model Ultem 1010, weight-average molecular weight about 48,000.

PE10100: Pluronic PE 10100 manufactured by BASF, weight-average molecular weight about 3,500.

373885: glycerol propoxylate-block-ethoxylate manufactured by Aldrich, weight-average molecular weight about 4,000.

PVP: polyvinylpyrrolidone, purchased from ACROS, model K16-18, weight-average molecular weight about 8,000. Commonly known as pore-forming agent.

Preparation Example of Polyvinylidene Fluoride/Polyetherimide Casting Solution

Preparation Example 1

105 grams of N-methylpyrrolidone (NMP), 13.5 grams of polyvinylidene fluoride, and 13.5 grams of polyetherimide were added into a flask equipped with a stirring device, an addition funnel, a condenser, and a thermometer. Stirring was performed while heating until the powders of polyvinylidene fluoride and polyetherimide were completely dissolved and the solution was emulsified.

Secondly, 3 grams of Pluronic PE 10100 as a polyether-type nonionic surfactant was dissolved in 15 ml of N-methylpyrrolidone. The surfactant solution was added dropwise into the flask from the dropping funnel. After the dropwise addition was completed, the mixture was stirred in a 60° C. water bath at 500 rpm for 4 hours. Then, the water bath was removed and left to stand for 8 hours to eliminate bubbles to obtain polyvinylidene fluoride/polyetherimide casting solution I with a total weight of 150 g.

Preparation Examples 2 to 8

Preparation examples 2 to 8 were prepared by the same steps as those in Preparation example 1, except that the type and amount of each component were changed (as shown in Table 1) to obtain polyvinylidene fluoride/polyetherimide casting solutions II to VIII.

TABLE 1

| | | Preparation example | | | | | | | |
|---|---|---|---|---|---|---|---|---|---|
| | | 1 | 2 | 3 | 4 | 5 | 6 | 7 | 8 |
| Main (g) | PVDF | 13.5 | 18 | 21 | 18 | 25.5 | 24 | 38 | 27 |
| component | PEI | 13.5 | 9 | 6 | 9 | 1.5 | 12 | 2 | — |
| Additive (g) | PVP | — | — | — | — | — | — | — | 3 |
| | PE10100 | 3 | 3 | 3 | 0.3 | 0.3 | — | 2 | — |
| | 373885 | — | — | — | — | — | 4 | 2 | — |
| Solvent (g) | NMP | 120 | 120 | 120 | 123 | 123 | 160 | 156 | 120 |
| Casting solution | | I | II | III | IV | V | VI | VII | VIII |
| Casting solution total weight (g) | | 150 | 150 | 150 | 150 | 150 | 200 | 200 | 150 |
| Total solid content (%) | | 20 | 20 | 20 | 18.20 | 18.20 | 20 | 22 | 20 |
| Viscosity detection value (Cps) | | 3069 | 3871 | 4554 | 3783 | 4767 | 3836 | 8950 | 7316 |

Examples of Polyvinylidene Fluoride Isolation Film Structure

Example 1 to Example 12 and Comparative example 1 to Comparative example 3 of the polyvinylidene fluoride isolation film structure are described below:

Example 1

The polyvinylidene fluoride/polyetherimide casting solution I obtained in Preparation example 1 was poured into the front edge of the blade of a blade coater, then using a blade with a width of 18.5 cm and setting the stroke length of the coater to 28 cm, the coating material was covered on a PP porous non-woven fabric having a width of 24 cm and a length of 30 cm at a coating speed of 30 mm/s and exposed to air for about 10 seconds, and them immersed in a 30° C. water bath for 30 minutes. The film was removed and dried at room temperature for 1 day to obtain the polyvinylidene fluoride isolation film of Example 1 containing a support material. Next, the material composition and various physical properties of the polyvinylidene fluoride isolation film were measured and calculated as shown in Table 2 below.

Examples 2 to 12 and Comparative Example 1

The polyvinylidene fluoride isolation films of Examples 2 to 12 and Comparative example 1 were prepared by the same steps as Example 1, and the difference was that the material composition of the polyvinylidene fluoride/polyetherimide casting solution, the water bath temperature, and various physical properties were changed, as shown in Table 2 and Table 3 below.

Examples 1G to 6G and Comparative Example 1G

The polyvinylidene fluoride isolation films of Examples 1G to 6G and Comparative example 1G were prepared in the same steps as in Example 1, and the difference was that coating was performed on a smooth glass plate with a blade coater and the coating material was exposed to air for about 10 seconds, then immersed in a 30° C. water bath for 30 minutes. At this time, the coating layer was separated from the smooth glass plate. The film was removed and dried at room temperature for 1 day. The coating length in the longitudinal direction (MD direction, that is, the blade moving direction when the blade coater was in operation) was 28.0 cm, and the coating width in the lateral direction (TD direction, that is, the direction orthogonal to the blade moving direction) was 18.5 cm. The resulting polyvinylidene fluoride isolation films became polyvinylidene fluoride isolation films without a support material after undergoing a phase inversion step. The material composition and various physical properties thereof are shown in Table 2 to Table 4 below.

TABLE 2

| | Example | | | | | | | | Comparative example | |
|---|---|---|---|---|---|---|---|---|---|---|
| | 1 | 2 | 3 | 4 | 5 | 5G | 6 | 6G | 1 | 1G |
| Casting solution | I | II | III | V | VI | VI | VII | VII | VIII | VIII |
| PVDF:PEI | 1:1 | 2:1 | 3.5:1 | 17:1 | 2:1 | 2:1 | 19:1 | 19:1 | — | — |
| Surfactant type | Straight chain | Straight chain | Straight chain | Straight chain | Branched chain | Branched chain | Straight chain/branched chain | Straight chain/branched chain | PVP | PVP |
| Surfactant weight percentage (%) (no solvent) | 10 | 10 | 10 | 1.1 | 10 | 10 | 4.5/4.5 | 4.5/4.5 | 10 | 10 |
| Water bath temperature (° C.) | 30 | 30 | 30 | 30 | 25 | 25 | 25 | 25 | 30 | 30 |
| PEI particle size distribution (μm) | 7.50 to 16.03 | 2.39 to 4.79 | 1.28 to 2.73 | 0.178 to 0.263 | 2.53 to 8.35 | 2.16 to 5.91 | 1.13 to 1.50 | 0.117 to 0.427 | | |
| Opening diameter distribution (nm) | 77.4 to 257.9 | 3.08 to 162.45 | 56 to 134 | 57 to 85 | 61 to 151 | 59 to 137 | 66 to 206 | 22.9 to 37.5 | 56 to 77 | to 60 |
| Film surface contact angle | 80.94 | 77.73 | 81.22 | 78.01 | 77.45 | 76.25 | 82.53 | 72.04 | 69.37 | 78.63 |
| Disappearance time of droplet (s) | 13 | 28 | 34 | 237 | 48 | 118 | 161 | 68 | >>300 | >>300 |
| Pure water flux (ml/min-cm²) | >>2 | 0.9173 | 0.4411 | 0.1761 | 1.8296 | 1.4719 | 0.8952 | 1.0245 | 0.1724 | 0.01966 |

TABLE 3

| | Example | | | | | |
|---|---|---|---|---|---|---|
| | 7 | 8 | 9 | 10 | 11 | 12 |
| Casting solution | IV | IV | V | I | II | III |
| PVDF:PEI | 2:1 | 2:1 | 17:1 | 1:1 | 2:1 | 3.5:1 |
| Surfactant type | Straight chain | Straight chain | Straight chain | Straight chain | Straight chain | Straight chain |
| Surfactant weight percentage (%) | 1.1 | 1.1 | 1.1 | 10 | 10 | 10 |
| Water bath temperature (° C.) | 30 | 50 | 50 | 40 | 40 | 50 |
| PEI particle size distribution (μm) | 1.59 to 3.10 | 1.41 to 3.85 | 0.286 to 0.418 | 5.06 to 18.00 | 2.56 to 6.19 | 1.13 to 3.12 |
| Opening diameter distribution (nm) | 56 to 107 | 72 to 92 | 73 to 133 | 97.0 to 340.6 | 56.3 to 159.1 | 70 to 175 |

TABLE 4

| | Example | | | | | | Comparative example |
|---|---|---|---|---|---|---|---|
| | 1G | 2G | 3G | 4G | 5G | 6G | 1G |
| Casting solution | I | II | III | V | VI | VII | VIII |
| PVDF:PEI | 1:1 | 2:1 | 3.5:1 | 17:1 | 2:1 | 19:1 | — |

TABLE 4-continued

| | Example | | | | | | Comparative example |
| --- | --- | --- | --- | --- | --- | --- | --- |
| | 1G | 2G | 3G | 4G | 5G | 6G | 1G |
| Surfactant type | Straight chain | Straight chain | Straight chain | Straight chain | Branched chain | Straight chain/ branched chain | PVP |
| Surfactant weight percentage (%) | 10 | 10 | 10 | 1.1 | 10 | 4.5/4.5 | 10 |
| Water bath temperature (° C.) | 30 | 30 | 30 | 30 | 25 | 25 | 30 |
| MD direction shrinkage rate | −0.36% | −2.71% | −6.07% | −9.76% | −3.57% | −8.21% | −12.50% |
| TD direction shrinkage rate | 0% | −1.88% | −4.32% | −9.02% | −3.78% | −9.73% | −12.43% |

It may be seen from Table 2 to Table 4 that the content of the polyvinylidene fluoride was greater than or equal to the content of the polyetherimide, and compared with the polyvinylidene fluoride isolation films (Examples 1 to 12) prepared by the polyvinylidene fluoride isolation film composition containing the polyether-type nonionic surfactant, the polyvinylidene fluoride isolation film of Comparative example 1 without polyetherimide had high shrinkage rate, lower water flux, and worse wettability.

In addition, when the temperature of the water bath in the phase inversion step was increased (Examples 2 and 11), the particle size of the polyetherimide precipitation was increased. However, when the content of the polyether-type nonionic surfactant was lower (Examples 7 to 9), even if the temperature of the water bath was increased, the particle size of the polyetherimide did not change significantly. Therefore, the addition of the polyether-type nonionic surfactant facilitated the solid precipitation of the polyetherimide, and the particle size thereof may be adjusted.

Based on the above, the polyvinylidene fluoride isolation film composition of the disclosure contains a specific ratio of polyetherimide, and contains a polyether-type nonionic surfactant. Therefore, the prepared polyvinylidene fluoride isolation film may alleviate technical issues such as high shrinkage rate, lower water flux, and poor wettability in the prior art.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A polyvinylidene fluoride film composition, comprising:
 a polyvinylidene fluoride;
 a polyetherimide; and
 a polyether-based nonionic surfactant,
 wherein the weight ratio of the polyvinylidene fluoride to the polyetherimide is 1:1 to 19:1,
 the content of the polyether-based nonionic surfactant is 0.1% to 10% by weight based on a total of 100% by weight of the polyvinylidene fluoride film composition, wherein the polyether-based nonionic surfactant is a polyoxyethylene-polyoxypropylene copolymer, and the polyoxyethylene-polyoxypropylene copolymer has a weight-average molecular weight of 1,000 to 10,000.

2. The polyvinylidene fluoride film composition of claim 1, wherein the polyvinylidene fluoride has a weight-average molecular weight of 200,000 to 1,000,000.

3. The polyvinylidene fluoride film composition of claim 1, wherein the polyvinylidene fluoride has a weight-average molecular weight of 400,000 to 600,000.

4. The polyvinylidene fluoride film composition of claim 1, wherein the polyetherimide has a weight-average molecular weight of 20,000 to 100,000.

5. The polyvinylidene fluoride film composition of claim 1, wherein polyetherimide has a weight-average molecular weight of 40,000 to 60,000.

6. The polyvinylidene fluoride film composition of claim 1, wherein the polyoxyethylene-polyoxypropylene copolymer has at least one of structures shown in the following formula (C-1) to formula (C-4):

formula (C-1)

formula (C-2)

formula (C-3)

-continued formula (C-4)

in formula (C-1) to formula (C-4), a1 to a9 independently represent an average repeating number of an oxypropylene group, which is a number of 1 to 100, and b1 to b10 independently represent an average repeating number of an oxyethylene group, which is a number of 1 to 100.

7. The polyvinylidene fluoride film composition of claim 1, wherein the polyether-type nonionic surfactant has a branched structure.

8. A polyvinylidene fluoride isolation film, comprising:
a polyvinylidene fluoride film, wherein the polyvinylidene fluoride film comprises the composition as claimed in claim 1;
a plurality of micro-holes dispersed in the polyvinylidene fluoride film to form openings at a surface of the polyvinylidene fluoride film,
wherein the polyetherimide is in a form of particles, and the particles are distributed at a surface of the micro-holes.

9. The polyvinylidene fluoride isolation film of claim 8, wherein the openings have a diameter in a range from 50 nm to 400 nm.

10. The polyvinylidene fluoride isolation film of claim 8, wherein the micro-holes are finger-shaped grooves.

11. The polyvinylidene fluoride isolation film of claim 8, wherein the particles have average particle size in a range from 100 nm to 20 μm.

* * * * *